(12) United States Patent
Adelman et al.

(10) Patent No.: US 12,389,916 B2
(45) Date of Patent: Aug. 19, 2025

(54) FLOUR- AND MEAL-BASED FOOD PRODUCTS COMPRISING INSOLUBLE ALPHA-1,3-GLUCAN

(71) Applicant: NUTRITION & BIOSCIENCES USA 4, INC., Rochester, NY (US)

(72) Inventors: Douglas J. Adelman, Wilmington, DE (US); Natnael Behabtu, Wilmington, DE (US)

(73) Assignee: NUTRITION & BIOSCIENCES USA 4, INC., Wilmington, DE (US)

( * ) Notice: Subject to any disclaimer, the term of this patent is extended or adjusted under 35 U.S.C. 154(b) by 643 days.

(21) Appl. No.: 17/634,058

(22) PCT Filed: Aug. 12, 2020

(86) PCT No.: PCT/US2020/045882
§ 371 (c)(1),
(2) Date: Feb. 9, 2022

(87) PCT Pub. No.: WO2021/034561
PCT Pub. Date: Feb. 25, 2021

(65) Prior Publication Data
US 2022/0322685 A1    Oct. 13, 2022

Related U.S. Application Data

(60) Provisional application No. 62/887,832, filed on Aug. 16, 2019.

(51) Int. Cl.
*A21D 2/18* (2006.01)
*A21D 8/04* (2006.01)
*A21D 13/06* (2017.01)

(52) U.S. Cl.
CPC .............. *A21D 2/18* (2013.01); *A21D 8/042* (2013.01); *A21D 13/06* (2013.01)

(58) Field of Classification Search
CPC .......... A21D 2/18; A21D 8/042; A21D 13/06
See application file for complete search history.

(56) References Cited

U.S. PATENT DOCUMENTS

| | | |
|---|---|---|
| 3,889,003 A | 6/1975 | Yourman |
| 3,930,055 A | 12/1975 | Engelman et al. |
| 3,987,206 A | 10/1976 | Titcomb et al. |
| 4,367,241 A | 1/1983 | Chablaix |
| 4,645,673 A | 2/1987 | Wilmes |
| 4,687,673 A | 8/1987 | Harris, Jr. et al. |
| 4,849,230 A | 7/1989 | Varvello |
| 5,403,610 A | 4/1995 | Murphy et al. |

(Continued)

FOREIGN PATENT DOCUMENTS

| | | | |
|---|---|---|---|
| DE | 10209629 B3 | 1/2004 | |
| WO | 2017079595 A1 | 5/2017 | |
| WO | WO-2017207663 A1 * | 12/2017 | ............. A21D 8/042 |

OTHER PUBLICATIONS

International Preliminary Report on Patentability for PCT/US2020/045882 issued on Feb. 17, 2022.

(Continued)

*Primary Examiner* — Jenna A Watts (57) ABSTRACT

Disclosed herein are food and food dough comprising at least flour and/or meal, and insoluble alpha-1,3-glucan. Further disclosed are methods of producing such food and food dough.

20 Claims, 2 Drawing Sheets

(56) References Cited

U.S. PATENT DOCUMENTS

| | | |
|---|---|---|
| 5,409,717 A | 4/1995 | Apicella et al. |
| 6,399,119 B1 | 6/2002 | Vandamme et al. |
| 7,000,000 B1 | 2/2006 | O'Brien |
| 7,780,970 B2 | 8/2010 | Schlothauer et al. |
| 7,815,952 B2 | 10/2010 | Inoue et al. |
| 7,947,319 B2 | 5/2011 | Fukasawa |
| 8,168,242 B2 | 5/2012 | Henderson et al. |
| 8,486,469 B2 | 7/2013 | Coleman et al. |
| 8,871,474 B2 | 10/2014 | Payne et al. |
| 9,107,440 B2 | 8/2015 | Larsen et al. |
| 9,719,121 B2 | 8/2017 | Fake et al. |
| 9,883,679 B2 | 2/2018 | Wahl et al. |
| 10,059,779 B2 | 8/2018 | Nambiar et al. |
| 10,260,053 B2 | 4/2019 | Paullin et al. |
| 10,301,604 B2 | 5/2019 | Li et al. |
| 2005/0013900 A1 | 1/2005 | Dohl et al. |
| 2009/0123603 A1 | 5/2009 | Carlson et al. |
| 2009/0297663 A1 | 12/2009 | Van Geel-Schutten et al. |
| 2011/0256261 A1* | 10/2011 | Jane .................. A21D 2/18 426/64 |
| 2011/0293782 A1 | 12/2011 | Katzir et al. |
| 2012/0107450 A1 | 5/2012 | Folkenberg et al. |
| 2013/0216652 A1 | 8/2013 | Sans-Valero et al. |
| 2015/0232819 A1 | 8/2015 | Paullin et al. |
| 2017/0002335 A1 | 1/2017 | Payne et al. |
| 2017/0006902 A1 | 1/2017 | Garske |
| 2017/0073717 A1 | 3/2017 | Larsen et al. |
| 2017/0198322 A1 | 7/2017 | Cheng et al. |
| 2017/0198323 A1 | 7/2017 | Cheng et al. |
| 2017/0198324 A1* | 7/2017 | Cheng .................. A61K 31/721 |
| 2017/0204442 A1 | 7/2017 | Dicosimo et al. |
| 2017/0218093 A1 | 8/2017 | Cheng et al. |
| 2017/0332670 A1 | 11/2017 | Ichikawa |
| 2018/0021238 A1 | 1/2018 | Huh et al. |
| 2018/0030310 A1 | 2/2018 | December et al. |
| 2018/0049457 A1 | 2/2018 | Cheng et al. |
| 2018/0110255 A1 | 4/2018 | Chu et al. |
| 2018/0146699 A1 | 5/2018 | Vafeiadi et al. |
| 2018/0282385 A1 | 10/2018 | Cheng et al. |
| 2018/0291311 A1 | 10/2018 | Dicosimo et al. |
| 2018/0312781 A1 | 11/2018 | Dicosimo et al. |
| 2018/0340199 A1 | 11/2018 | Nagy et al. |
| 2019/0078062 A1 | 3/2019 | Li et al. |
| 2019/0078063 A1 | 3/2019 | Li et al. |
| 2019/0112456 A1 | 4/2019 | Bell et al. |
| 2019/0136153 A1 | 5/2019 | Dicosimo et al. |
| 2019/0185893 A1 | 6/2019 | Guan et al. |
| 2019/0276806 A1 | 9/2019 | Li et al. |
| 2020/0022385 A1 | 1/2020 | Ichikawa et al. |
| 2020/0131281 A1 | 4/2020 | Guan et al. |
| 2020/0165360 A1 | 5/2020 | Behabtu et al. |
| 2021/0076724 A1 | 3/2021 | Buthe et al. |
| 2021/0130504 A1 | 5/2021 | Kim et al. |
| 2021/0282422 A1 | 9/2021 | Poulsen et al. |

OTHER PUBLICATIONS

Galle et al., 2012, Int. J. Food Microbiol. 155:105-112.
Leemhuis et al., 2013, J. Biotechnol. 163:250-272.
Meng et al., 2015, J. Agric . . . Food Chem. 64:433-442.
Irague et al., 2011, Biomacromolecules 13:187-195.

* cited by examiner

FLOUR- AND MEAL-BASED FOOD PRODUCTS COMPRISING INSOLUBLE ALPHA-1,3-GLUCAN

This application is a National Stage application of International Application No. PCT/US2020/045882 (filed Aug. 12, 2020), which claims the benefit of U.S. Provisional Application No. 62/887,832 (filed Aug. 16, 2019), both of which prior applications are incorporated herein by reference in their entirety.

FIELD

The present disclosure is in the field of food products. For example, the disclosure pertains to food and food dough comprising flour and insoluble alpha-1,3-glucan, and methods of producing these food products.

BACKGROUND

Bread and other flour-containing products are abundantly consumed. These food products typically contain a high amount of digestible carbohydrates, which are present in the flour component and include starch, simple sugars, and complex sugars. Following consumption, digestible starch and complex sugars are broken down by enzymatic hydrolysis into individual sugar molecules, which are then absorbed into circulation from the gastrointestinal tract. This absorption of sugars constitutes most of the calories taken in by individuals when ingesting flour-containing products. Efforts have been undertaken to reduce this source of calories, such as by replacing flour with non-digestible fiber ingredients.

Other ingredients commonly used in making flour-containing products include wheat gluten and soy protein isolate, which can be considered as flour replacers. Gluten is an elastic, proteinaceous component of flour that gives bread and similar baked products sufficient cohesiveness to rise and maintain shape. However, addition of too much gluten can result in an unworkable dough mass that cannot be processed by conventional dough handling devices. While addition of soy protein isolate can provide protein and insoluble fiber to dough, this ingredient does not contribute to bread dough cohesiveness. Aside from these operational issues of gluten and/or soy protein, these ingredients can present digestive problems (e.g., allergy, intolerance) to some consumers.

Thus, new modes are desired for replacing flour, increasing dietary fiber, and/or reducing gluten in foods. Insoluble alpha-1,3 glucan as an ingredient in flour-containing food is disclosed herein for addressing this opportunity.

SUMMARY

In one embodiment, the present disclosure concerns a food or food dough comprising at least (i) flour and/or meal, and (ii) insoluble alpha-1,3-glucan.

In another embodiment, the present disclosure concerns a method of producing a food dough herein, the method comprising: mixing at least (i) flour and/or meal, (ii) insoluble alpha-1,3-glucan, and (iii) an aqueous composition together to produce a food dough.

In another embodiment, the present disclosure concerns a method of producing a food dough herein, the method comprising: mixing at least (i) flour and/or meal, (ii) an aqueous composition, (iii) sucrose and (iv) a glucosyltransferase enzyme that synthesizes insoluble alpha-1,3-glucan, whereby a food dough is produced that comprises insoluble alpha-1,3-glucan.

DETAILED DESCRIPTION

The disclosures of all cited patent and non-patent literature are incorporated herein by reference in their entirety.

Unless otherwise disclosed, the terms "a" and "an" as used herein are intended to encompass one or more (i.e., at least one) of a referenced feature.

Where present, all ranges are inclusive and combinable, except as otherwise noted. For example, when a range of "1 to 5" (i.e., 1-5) is recited, the recited range should be construed as including ranges "1 to 4", "1 to 3", "1-2", "1-2 & 4-5", "1-3 & 5", and the like.

The term "saccharide" and other like terms herein refer to monosaccharides and/or disaccharides/oligosaccharides, unless otherwise noted. A "disaccharide" herein refers to a carbohydrate having two monosaccharides joined by a glycosidic linkage. An "oligosaccharide" herein can refer to a carbohydrate having 3 to 15 monosaccharides, for example, joined by glycosidic linkages. An oligosaccharide can also be referred to as an "oligomer". Monosaccharides (e.g., glucose and/or fructose) comprised within disaccharides/oligosaccharides can be referred to as "monomeric units", "monosaccharide units", or other like terms.

The terms "alpha-glucan", "alpha-glucan polymer" and the like are used interchangeably herein. An alpha-glucan is a polymer comprising glucose monomeric units linked together by alpha-glycosidic linkages. Alpha-glucan herein can be in the form of an oligosaccharide or polysaccharide. In typical embodiments, an alpha-glucan herein comprises at least about 80%, 81%, 82%, 83%, 84%, 85%, 86%, 87%, 88%, 89%, 90%, 91%, 92%, 93%, 94%, 95%, 96%, 97%, 98%, 99%, or 100% alpha-glycosidic linkages. Examples of alpha-glucan polymers herein include alpha-1,3-glucan. Glucose as comprised within an alpha-glucan or other carbohydrate herein can be referred to as glucose monomeric unit(s), glucose monomer(s), glucose units, or other like terms.

The terms "alpha-1,3-glucan", "poly alpha-1,3-glucan", "alpha-1,3-glucan polymer" and the like are used interchangeably herein. Alpha-1,3-glucan is a polymer comprising glucose monomeric units linked together by glycosidic linkages, wherein at least about 30% of the glycosidic linkages are alpha-1,3. Alpha-1,3-glucan in certain embodiments comprises at least about 90% or 95% alpha-1,3 glycosidic linkages. Most or all of the other linkages in alpha-1,3-glucan herein typically are alpha-1,6, though some linkages may also be alpha-1,2 and/or alpha-1,4.

The terms "glycosidic linkage", "glycosidic bond", "linkage" and the like are used interchangeably herein and refer to the covalent bond that joins a carbohydrate (sugar) molecule to another group such as another carbohydrate. The term "alpha-1,3-glycosidic linkage" as used herein refers to the type of covalent bond that joins alpha-D-glucose molecules to each other through carbons 1 and 3 on adjacent alpha-D-glucose rings. The glycosidic linkages of a glucan polymer herein can also be referred to as "glucosidic linkages". Herein, "alpha-D-glucose" is referred to as "glucose", unless otherwise noted.

The linkage profile of an alpha-glucan or graft copolymer herein can be determined using any method known in the art. For example, a linkage profile can be determined using methods using nuclear magnetic resonance (NMR) spectroscopy (e.g., $^{13}$C NMR or $^1$H NMR). These and other methods that can be used are disclosed in, for example, *Food Carbohydrates: Chemistry, Physical Properties, and Applications* (S. W. Cui Ed., Chapter 3, S. W. Cui, Structural Analysis of Polysaccharides, Taylor & Francis Group LLC, Boca Raton, FL, 2005), which is incorporated herein by reference.

The "molecular weight" of large alpha-glucan polymers herein can be represented as weight-average molecular weight (Mw) or number-average molecular weight (Mn), the units of which are in Daltons or grams/mole. Alternatively, such molecular weight can be represented as DPw (weight average degree of polymerization) or DPn (number average degree of polymerization). The molecular weight of smaller polymers such as oligosaccharides typically can be provided as "DP" (degree of polymerization), which simply refers to the number of glucoses comprised within the alpha-glucan; "DP" can also characterize the molecular weight of a polymer on an individual molecule basis. Various means for calculating these various molecular weight measurements can be employed such as high-pressure liquid chromatography (HPLC), size exclusion chromatography (SEC), or gel permeation chromatography (GPC).

The terms "particle", "particulate", "granule", "grain" and other like terms are interchangeably used herein. A particle in some aspects has an average size of about 1 to 200 micrometers (microns). The terms "particulated", "granulated", and other like terms, can be used to characterize particles of insoluble glucan herein. Particle size in some aspects can refer to particle diameter and/or the length of the longest particle dimension. The average size can be based on the average of diameters and/or longest particle dimensions of at least 50, 100, 500, 1000, 2500, 5000, or 10000 particles, for example.

The term "sucrose" herein refers to a non-reducing disaccharide composed of an alpha-D-glucose molecule and a beta-D-fructose molecule linked by an alpha-1,2-glycosidic bond. Sucrose is known commonly as table sugar. Sucrose can alternatively be referred to as "alpha-D-glucopyranosyl-(1→2)-beta-D-fructofuranoside". "Alpha-D-glucopyranosyl" and "glucosyl" are used interchangeably herein.

The terms "glucosyltransferase", "glucosyltransferase enzyme", "GTF", "glucansucrase" and the like are used interchangeably herein. The activity of a glucosyltransferase herein catalyzes the reaction of the substrate sucrose to make the products alpha-glucan and fructose. Other products (by-products) of a GTF reaction can include glucose, various soluble gluco-oligosaccharides, and leucrose. Wild type forms of glucosyltransferase enzymes generally contain (in the N-terminal to C-terminal direction) a signal peptide (which is typically removed by cleavage processes), a variable domain, a catalytic domain, and a glucan-binding domain. A glucosyltransferase herein is classified under the glycoside hydrolase family 70 (GH70) according to the CAZy (Carbohydrate-Active EnZymes) database (Cantarel et al., *Nucleic Acids Res.* 37: D233-238, 2009).

The term "glucosyltransferase catalytic domain" herein refers to the domain of a glucosyltransferase enzyme that provides alpha-glucan-synthesizing activity to a glucosyltransferase enzyme. A glucosyltransferase catalytic domain typically does not require the presence of any other domains to have this activity.

The terms "enzymatic reaction", "glucosyltransferase reaction", "glucan synthesis reaction", "reaction composition", "reaction formulation" and the like are used interchangeably herein and generally refer to a reaction that initially comprises water, sucrose, at least one active glucosyltransferase enzyme, and optionally other components. Components that can be further present in a glucosyltransferase reaction typically after it has commenced include fructose, glucose, leucrose, soluble gluco-oligosaccharides (e.g., DP2-DP7) (such may be considered as products or by-products, depending on the glucosyltransferase used), and/or insoluble alpha-glucan products) of DP8 or higher. It would be understood that certain glucan products, such as alpha-1,3-glucan with a degree of polymerization (DP) of at least 8 or 9, are water-insoluble and thus not dissolved in a glucan synthesis reaction. The term "under suitable reaction conditions" as used herein refers to reaction conditions that support conversion of sucrose to alpha-glucan product(s) via glucosyltransferase enzyme activity. It is during such a reaction that glucosyl groups originally derived from the input sucrose are enzymatically transferred and used in alpha-glucan polymer synthesis; glucosyl groups as involved in this process can thus optionally be referred to as the glucosyl component or moiety (or like terms) of a glucosyltransferase reaction.

The term "in situ" as used herein characterizes a glucosyltransferase reaction that occurs inside a food dough or precursor thereof (e.g., incompletely mixed dough) and thereby produces insoluble alpha-1,3-glucan within the food dough itself (or precursor). In situ production of alpha-1,3-glucan typically substitutes for adding insoluble alpha-1,3-glucan as an ingredient in food dough production herein.

The terms "percent by volume", "volume percent", "vol %", "v/v %" and the like are used interchangeably herein. The percent by volume of a solute in a solution can be determined using the formula: [(volume of solute)/(volume of solution)]×100%.

The terms "percent by weight", "weight percentage (wt %)", "weight-weight percentage (% w/w)" and the like are used interchangeably herein. Percent by weight refers to the percentage of a material on a mass basis as it is comprised in a composition, mixture, or solution.

The terms "weight/volume percent", "w/v %" and the like are used interchangeably herein. Weight/volume percent can be calculated as: ((mass [g] of material)/(total volume [mL] of the material plus the liquid in which the material is placed))×100%. The material can be insoluble in the liquid (i.e., be a solid phase in a liquid phase, such as with a dispersion), or soluble in the liquid (i.e., be a solute dissolved in the liquid).

The terms "ingestible product" and "ingestible composition" are used interchangeably herein, and refer to any substance that, either alone or together with another substance, may be taken orally (i.e., by mouth), whether intended for consumption or not. Thus, an ingestible product includes food/beverage products. "Food/beverage products" refer to any edible product intended for consumption (e.g., for nutritional purposes) by humans or animals, including solids, semi-solids, or liquids. A "food" herein can optionally be referred to as a "foodstuff", "food product", or other like term, for example. A food herein can further comprise insoluble alpha-1,3-glucan. While the present disclosure generally regards food and food precursors (e.g., dough) that are by definition intended for ingestion or eventual ingestion (food precursor first made into food before being eaten), the disclosure also regards ingestible products comprising at least flour and insoluble alpha-1,3-glucan.

"Flour" and like terms herein refer to powder made by grinding (milling) grains/cereals, roots/tubers, beans/legumes, or nuts/seeds, for example. Typically, the material that is ground into flour is entered into the grinding process in raw, dried form. A flour herein that is made from grain can optionally be referred to as a "grain flour". "Meal" and other like terms herein refer to a substance that is similar to flour, but with a grain or particle size that is larger/coarser. A meal is not ground/milled as finely as flour. A meal herein that is made from grain can optionally be referred to as a "grain meal". Flour and meal are generally used as ingredients in various food products. Flour and meal produced from a grain can optionally be characterized as grain derivatives herein.

"Dough", "food dough" and like terms herein refer to a mixture comprising at least (i) flour and/or meal and (ii) a liquid (e.g., water or milk), and typically is in a suitable form (stiff/firm) for kneading or rolling. A dough can optionally be referred to with reference to the grain, grain derivative, or other material from which it was derived (e.g., wheat dough, wheat flour dough, corn flour dough, cornmeal dough). A dough herein can further comprise insoluble alpha-1,3-glucan. Since dough typically is not eaten as a food prior to further processing (e.g., baking), dough can optionally be characterized as a "food precursor".

A "baked food" (and like terms) herein refers to a food that has been baked during its preparation. Baking herein refers to a process of applying dry heat to a food/food precursor for a period of time during preparation of the food. In general, baking is conducted in an enclosed (typically confined) space such as within an oven. Bread is an example of a food for which its preparation process comprises baking.

An "extruded food" (and like terms) herein refers to a food that has been extruded during its preparation. Food extrusion is a process by which a mix of ingredients (e.g., dough) is forced through an opening in a perforated device (e.g., plate or die), which typically is specifically designed for the food being extruded. After this step, an extruded food typically is then cut to a particular size.

The terms "dietary fiber", "glucan fiber" and the like herein refer to an alpha-glucan that is indigestible and/or that does not increase blood-glucose levels when enterally administered to a mammal. In general, a dietary fiber herein is not significantly hydrolyzed by endogenous enzymes in the upper gastrointestinal tract of mammals such as humans.

"Gluten" herein refers to a group of proteins, termed prolamins and glutelins, which occur with starch in the endosperm of cereal grains. Gluten has been previously described by Wieser (2007, *Food Microbiol.* 2007 24:115-119), for example, which is incorporated herein by reference.

The terms "aqueous liquid", "aqueous fluid" and the like as used herein can refer to water or an aqueous solution. An "aqueous solution" herein can comprise one or more dissolved salts, where the maximal total salt concentration can be about 3.5 wt % in some embodiments. Although aqueous liquids herein typically comprise water as the only solvent in the liquid, an aqueous liquid can optionally comprise one or more other solvents (e.g., polar organic solvent) that are miscible in water. Thus, an aqueous solution can comprise a solvent having at least about 10 wt % water.

An "aqueous composition" herein has a liquid component that comprises about, or at least about, 10, 20, 30, 40, 50, 60, 70, 80, 90, 95, 99, or 100 wt % water, for example. Examples of aqueous compositions include mixtures, solutions, dispersions (e.g., colloidal dispersions), suspensions and emulsions, for example.

As used herein, the term "colloidal dispersion" refers to a heterogeneous system having a dispersed phase and a dispersion medium, i.e., microscopically dispersed insoluble particles are suspended throughout another substance (e.g., an aqueous composition such as water or aqueous solution). An example of a colloidal dispersion herein is a hydrocolloid. All, or a portion of, the particles of a colloidal dispersion such as a hydrocolloid can comprise a graft copolymer herein. The terms "dispersant" and "dispersion agent" are used interchangeably herein to refer to a material that promotes the formation and/or stabilization of a dispersion. "Dispersing" herein refers to the act of preparing a dispersion of a material in an aqueous liquid.

An alpha-glucan that is "insoluble", "aqueous-insoluble", "water-insoluble" (and like terms) (e.g., alpha-1,3-glucan with a DP of 8 or higher) does not dissolve (or does not appreciably dissolve) in water or other aqueous conditions, optionally where the aqueous conditions are further characterized to have a pH of 4-9 (e.g., pH 6-8) (i.e., non-caustic) and/or a temperature of about 1 to 85° C. (e.g., 20-25° C.). In contrast, alpha-glucans such as certain oligosaccharides herein that are "soluble", "aqueous-soluble", "water-soluble" and the like (e.g., alpha-1,3-glucan with a DP less than 8) appreciably dissolve under these conditions.

The terms "sequence identity", "identity" and the like as used herein with respect to a polypeptide amino acid sequence (e.g., that of a glucosyltransferase) are as defined and determined in U.S. Pat. Appl. Publ. No. 2017/0002336, which is incorporated herein by reference.

Various polypeptide amino acid sequences and polynucleotide sequences are disclosed herein as features of certain embodiments. Variants of these sequences that are at least about 70-85%, 85-90%, or 90%-95% identical to the sequences disclosed herein can be used or referenced. Alternatively, a variant amino acid sequence or polynucleotide sequence can have at least 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98% or 99% identity with a sequence disclosed herein. The variant amino acid sequence or polynucleotide sequence has the same function/activity of the disclosed sequence, or at least about 80%, 81%, 82%, 83%, 84%, 85%, 86%, 87%, 88%, 89%, 90%, 91%, 92%, 93%, 94%, 95%, 96%, 97%, 98%, or 99% of the function/activity of the disclosed sequence.

The term "isolated" means a substance (or process) in a form or environment that does not occur in nature. A non-limiting example of an isolated substance includes any non-naturally occurring substance such as a food or food dough herein (as well as the processes used in preparation thereof). It is believed that the embodiments disclosed herein are synthetic/man-made (could not have been made except for human intervention/involvement), and/or have properties that are not naturally occurring.

The term "increased" as used herein can refer to a quantity or activity that is at least about 1%, 2%, 3%, 4%, 5%, 6%, 7%, 8%, 9%, 10%, 11%, 12%, 13%, 14%, 15%, 16%, 17%, 18%, 19%, 20%, 50%, 100%, or 200% more than the quantity or activity for which the increased quantity or activity is being compared. The terms "increased", "elevated", "enhanced", "greater than", "improved" and the like are used interchangeably herein.

New modes are desired for replacing flour, increasing dietary fiber, and/or reducing gluten in flour-containing foods. Insoluble alpha-1,3 glucan as an ingredient in this type of food is disclosed herein for addressing these opportunities.

Certain embodiments of the present disclosure concern a food or food dough comprising at least (i) flour and/or meal, and (ii) insoluble alpha-1,3-glucan. The use of insoluble alpha-1,3-glucan in such foods and food precursors constitutes, in some aspects, a new way of replacing flour therein while also increasing dietary fiber content and/or reducing gluten content.

A food or food dough as presently disclosed comprises insoluble alpha-1,3-glucan. Insoluble alpha-1,3-glucan in some aspects can comprise about, or at least about, 30%, 40%, 50%, 60%, 70%, 80%, 85%, 90%, 91%, 92%, 93%, 94%, 95%, 96%, 97%, 98%, 99%, 99.5%, or 100% alpha-1,3 glycosidic linkages. In some aspects, accordingly, insoluble alpha-1,3-glucan has less than about 70%, 60%, 50%, 40%, 30%, 20%, 15%, 10%, 9%, 8%, 7%, 6%, 5%, 4%, 3%, 2%, 1%, 0.5%, or 0% glycosidic linkages that are not alpha-1,3. Typically, the glycosidic linkages that are not alpha-1,3 are mostly or entirely alpha-1,6. In certain embodiments, insoluble alpha-1,3-glucan has no branch points or less than about 5%, 4%, 3%, 2%, or 1% branch points as a percent of the glycosidic linkages in the glucan.

The DPw, DPn, or DP of insoluble alpha-1,3-glucan in certain aspects can be about, or at least about, or less than about, 11, 12, 15, 20, 25, 30, 35, 40, 41, 42, 43, 44, 45, 46, 47, 48, 49, 50, 51, 52, 53, 54, 55, 56, 57, 58, 59, 60, 65, 70, 75, 80, 85, 90, 95, 100, 110, 125, 150, 175, 200, 300, 400, 500, 600, 700, 800, 900, 1000, 1100, 1200, 1300, 1400, 1500, 1600, or 1650. DPw, DPn, or DP can optionally be expressed as a range between any two of these values. Merely as examples, the DPw, DPn, or DP of alpha-1,3-glucan herein can be about 400-1650, 500-1650, 600-1650, 700-1650, 400-1250, 500-1250, 600-1250, 700-1250, 400-1000, 500-1000, 600-1000, 700-1000, 400-900, 500-900, 600-900, 700-900, 11-25, 12-25, 11-22, 12-22, 11-20, 12-20, 20-300, 20-200, 20-150, 20-100, 20-75, 30-300, 30-200, 30-150, 30-100, 30-75, 50-300, 50-200, 50-150, 50-100, 50-75, 75-300, 75-200, 75-150, 75-100, 100-300, 100-200, 100-150, 150-300, 150-200, 200-300, 15-100, 25-100, 35-100, 15-80, 25-80, 35-80, 15-60, 25-60, 35-60, 15-55, 25-55, 35-55, 40-100, 40-80, 40-60, 40-55, 40-50, 45-60, 45-55, or 45-50. DP can be referenced, for example, for alpha-1,3-glucan of relatively low molecular weight such as 200, 100, 50, or less DP.

Insoluble alpha-1,3-glucan in some aspects has an average particle size of about 1 to 100 microns. Examples of average particle sizes herein are about, at least about, or less than about, 1, 5, 10, 15, 20, 25, 30, 35, 40, 45, 50, 60, 70, 80, 90, 100, 1-100, 1-50, 1-40, 1-30, 1-25, 5-100, 5-50, 5-40, 5-30, 5-25, 10-100, 10-50, 10-40, 10-30, 10-25, 15-100, 15-50, 15-40, 15-30, or 15-25 microns. Average particle size herein typically is with respect to dry (e.g., has less than 3, 2, 1, 0.5, or 0.1 wt % water) alpha-1,3-glucan. Average particle size herein (e.g., any of the aforementioned micron values) can optionally be in terms of a "D50" (diameter-50) value of a sample of insoluble alpha-1,3-glucan particles. A D50 measurement for a sample of insoluble alpha-1,3-glucan particles is the particle diameter at which (i) 50% of the sample's mass is comprised of particles with a diameter less than this measurement, and (ii) 50% of the sample's mass is comprised of particles with a diameter greater than this measurement. Average particle size can be measured by a process comprising light scattering or electrical impedance change (e.g., using a Coulter Counter), and/or as described in any of U.S. Pat. Nos. 6,091,492, 6,741,350 and 9,297,737 (all incorporated herein by reference), for example.

Insoluble alpha-1,3-glucan particles in some aspects of the present disclosure have a degree of crystallinity (crystallinity index) of at least about 0.65. The degree of crystallinity of particles can be about, or at least about, 0.55, 0.60, 0.65, 0.66, 0.67, 0.68, 0.69, 0.70, 0.71, 0.72, 0.73, 0.74, 0.75, 0.76, 0.77, 0.78, 0.79, 0.80, 0.81, 0.82, 0.83, 0.84, 0.85, 0.60-0.83, 0.65-0.83, 0.67-0.83, 0.69-0.83, 0.60-0.81, 0.65-0.81, 0.67-0.81, 0.69-0.81, 0.60-0.78, 0.65-0.78, 0.67-0.78, 0.69-0.78, 0.60-0.76, 0.65-0.76, 0.67-0.76, or 0.69-0.76, for example. In general, that portion of insoluble alpha-1,3-glucan herein that is not crystalline is amorphous. The degree of crystallinity of alpha-glucan particles herein can be as when measured according to any suitable method, such as follows. A sample of insoluble alpha-1,3-glucan is dried for at least about 2 hours (e.g., 8-12 hours) in a vacuum oven set at about 55-65° C. (e.g., 60° C.). The sample is then be packed into a stainless steel holder with a well of about 1-2 cm wide by 3-5 cm long by 3-5 mm deep, after which the holder is loaded into a suitable diffractometer (e.g., X'PERT MPD POWDER diffractometer, PANalytical B.V., The Netherlands) set in reflection mode to measure the X-ray diffraction pattern of the sample. The X-ray source is a Cu X-ray tube line source with an optical focusing mirror and a ~1/16° narrowing slit. X-rays are detected with a 1-D detector and an anti-scatter slit set at ~1/8°. Data are collected in the range of about 4 to 60 degrees of two-theta at about 0.1 degrees per step. The resulting X-ray pattern is then analyzed by subtracting a linear baseline from about 7.2 to 30.5 degrees, subtracting the XRD pattern of a known amorphous alpha-1,3-glucan sample that has been scaled to fit the data, and then fitting the remaining crystal peaks in that range with a series of Gaussian curves corresponding to known dehydrated alpha-1,3-glucan crystal reflections. The area corresponding to the crystal peaks is then divided by the total area under the baseline-subtracted curve to yield a crystallinity index.

About, or at least about, 10, 20, 30, 40, 50, 60, 65, 70, 75, 80, 81, 82, 83, 84, 85, 86, 87, 88, 89, 90, 91, 92, 93, 94, 95, 96, 97, 98, 99, 60-85, 60-80, 60-75, 60-70, 65-85, 65-80, 65-75, 65-70, 70-85, 70-80, or 70-75 wt % of the particles of insoluble alpha-1,3-glucan in a composition herein can be in the form of plates, for example.

In some aspects of the present disclosure, such as those in which insoluble alpha-1,3-glucan particles have a degree of crystallinity of a least about 0.65 and/or are in the form of plates (e.g., as above), at least about 70% by weight of the alpha-1,3-glucan particles of a composition have a diameter of less than 1.0 micron. Yet, in some aspects, about, or at least about, 65%, 70%, 75%, 80%, 85%, 90%, 95%, 65-95%, 70-95%, 75-95%, 80-95%, 85-95%, 65-90%, 70-90%, 75-90%, 80-90%, 85-90%, 65-85%, 70-85%, 75-85%, or 80-85% by weight of the insoluble alpha-1,3-glucan particles of a composition have a diameter of less than about 1.0 micron. In some aspects, about 40-60%, 40-55%, 45-60%, 45-55%, 47-53%, 48-52%, 49-51%, or 50% by weight of the insoluble alpha-1,3-glucan particles have a diameter of about, or less than about, 1.0, 0.9, 0.8, 0.7, 0.6, 0.5, 0.4, 0.35, 0.34, 0.32, 0.30, 0.28, 0.26, 0.25, 0.24, 0.23, 0.22, 0.21, 0.20, 0.19, 0.18, 0.17, 0.16, 0.15, 0.14, 0.13, 0.12, 0.11, 0.10, 0.10-1.0, 0.10-0.80, 0.10-0.60, 0.10-0.40, 0.10-0.35, 0.10-0.30, 0.10-0.25, 0.10-0.20, 0.15-0.35, 0.15-0.30, 0.15-0.25, or 0.15-0.20 micron; these foregoing micron values can optionally be considered to be a "D50" (diameter-50) value. Alpha-1,3-glucan particles in some of these aspects can have a thickness of about 0.010, 0.015, 0.020, 0.025, 0.030, or 0.010-0.030 micron; such a thickness can be in conjunction with any of the foregoing diameter aspects. Particle size herein can be measured by a process comprising light scattering or electrical impedance change (e.g., using a Coulter Counter), as described in any of U.S. Pat. Nos. 6,091,492, 6,741,350 and 9,297,737 (all incorporated herein by reference), and/or as disclosed in the below Examples, for example. Particle size and/or distributions can be as measured for particles comprised in an aqueous dispersion, and/or as measured using a light scatter technique, for example. Alpha-1,3-glucan particles in some of these aspects have a polydispersity index (PDI) of about, or less than about, 1.13, 1.17, 1.2, 1.23, 1.27, 1.3, 1.13-1.3, 1.13-1.27, 1.13-1.23, 1.17-1.3, 1.17-1.27, 1.17-1.23, or 1.18-1.22.

In some aspects, insoluble alpha-1,3-glucan herein is as produced in a glucosyltransferase reaction that comprises, in addition to water, sucrose, and a glucosyltransferase enzyme, at least one primer. Examples of a suitable primer include dextran (e.g., as disclosed in any of U.S. Pat. Nos. 8,871,474 and 10,059,779, and U.S. Pat. Appl. Publ. No. 2019/0185893, all of which are incorporated herein by reference), alpha-1,2-branched dextran (e.g., as disclosed in U.S. Pat. Appl. Publ. No. 2019/0185893), and alpha-glucan derivatives (e.g., alpha-glucan ether or ester as disclosed in U.S. Pat. Appl. No. 62/750,520 [as originally filed], which is incorporated herein by reference). Insoluble alpha-1,3-glucan herein typically has not been chemically modified (e.g., oxidized and/or etherified).

Glucosyltransferases contemplated to be useful for producing insoluble alpha-1,3-glucan herein are disclosed in U.S. Pat. Nos. 7,000,000, 8,871,474, 10,301,604 and 10,260,053, U.S. Pat. Appl. Publ. Nos. 2019/0078062, 2019/0078063 and 2017/0002335, and U.S. patent application Ser. No. 16/295,423 (as originally filed), for example, all of which are incorporated herein by reference. Alpha-1,3-glucan in some embodiments can be as disclosed in any of the foregoing references, as well as in any of U.S. Pat. Appl. Publ. Nos. 2019/0185893, 2018/0340199, 2020/0165360 and 2020/0131281 (corresponds with U.S. Pat. Appl. No. 62/750,520 as originally filed), U.S. Pat. Appl. No. 63/035,978 (as originally filed), and Int. Pat. Appl. Publ. No. WO2017/079595, all of which are incorporated herein by reference.

A food or food dough as presently disclosed comprises flour and/or meal. In some aspects, a food or food dough comprises only flour or meal as the flour/meal component (one or more other ingredients that are not flour or meal, beyond alpha-1,3-glucan, can optionally be present), while in other embodiments there can be a mix of these ingredients. For example, the flour/meal component can comprise at least about 50, 60, 70, 80, 90, 95, 98, or 99 wt % flour, and less than about 50, 40, 30, 20, 10, 5, 2, or 1 wt % meal, or vice versa. There can be one, two, three, four, five, six or more different types of flour and/or meal, for example, in the flour/meal component of a food or food dough herein. Flour and/or meal herein can be that of a grain/cereal, root/tuber, bean/legume, or nut/seed in some aspects.

In some aspects, the average particle diameter of flour in a food or food dough can be any value as described above for the alpha-1,3-glucan component. Flour particle size optionally can be the same as, or within about ±1%, 2.5%, 5%, 10%, 15%, or 20% variation of the size of, the alpha-1,3-glucan particles of the food or food dough. The average particle size of a meal in a food or food dough herein can be about, or at least about, 150, 250, 500, 1000, 1500, 2000, 2500, 150-2500, 150-2000, or 150-1500 microns, for example. Meal can be bolted or unbolted in some aspects.

Suitable examples of a grain/cereal for making a flour and/or meal herein include grain of wheat (e.g., *Triticum aestivum, T. compactum, T. sphaerococcum*), *Hordeum vulgare* (barley), *Avena sativa* (oat), *Secale cereale* (rye), *Triticosecale* spp. (triticale), *Zea mays* (maize/corn), sorghum, millet (e.g., *Digitaria, Echinochioa, Eleusine, Panicum, Setaria, Pennisetum*), *Phalaris canariensis* (canary seed), rice (e.g., *Oryza* species such as *O. sativa, Zizania*), *Eragrostis abyssinica* (teff), and *Coix lacryma-jobi* (Job's tears), amaranth, buckwheat (e.g., *Fagopyrum, Eriogonum*) and quinoa. A grain can be dehulled or hulled. Examples of wheat varieties herein include winter and spring wheat, hard and soft, wheat, and red wheat and white wheat; some particular wheat varieties are winter wheat (e.g., hard red winter, soft red winter), spring wheat (e.g., hard red spring), durum (e.g., for making semolina), hard white wheat, and soft white wheat. Examples of corn varieties herein include dent corn, flour corn, sweet corn, flint corn, heirloom corn, and waxy corn. Examples of rice varieties herein include long grain rice, medium grain rice, short grain rice, sticky rice, basmati rice, jasmine rice, wild rice, Manmibyeo, Jinsumi, Seolgaeng, Hanareumbyeo, Chenmaai, and Goamibyeo. Examples of barley varieties herein include malting barley, Lacey, and Taylor. Flour made with grain can be whole grain flour in some aspects, which includes the germ and bran of the grain.

Suitable examples of roots and tubers for making a flour and/or meal herein include arrowroot, cassava/yucca/manioc/tapioca (e.g., sweet or bitter), potatoes, sweet potatoes, yams, taro root, carrot, beetroot, parsnip, ginger, lotus root and turmeric. Potatoes can be starchy potatoes (e.g., Russet, Idaho, Yukon gold) or waxy potatoes (e.g., red, blue, fingerling), for example. Other vegetables that are fruit (e.g., squash, pumpkins, tomatoes) or leaves (e.g., kale, spinach) of plants can be used to make flour or meal in some aspects.

Suitable examples of beans and legumes for making a flour and/or meal herein include chickpeas soybeans, mung beans, peas (yellow or green), black gram (urad dal), fava beans and lentils, while suitable examples of nuts and seeds include almonds, coconuts, Brazil nuts, cashews, pistachios, macadamias, peanuts, pecans, walnuts, hazelnuts, pine nuts, flaxseeds, sunflower seeds, chin seeds, pumpkin seeds, hemp seeds, and tiger nuts.

Flour made from wheat in some aspects herein can be in the form of whole wheat flour (includes the germ and bran), graham flour, cake flour, pastry flour, all-purpose (plain) flour, atta flour, or maida flour. Corn flour herein typically is made of finely ground cornmeal. Cornmeal in some aspects can be unprocessed or further processed (e.g., leached with lye to make corn masa).

A food as presently disclosed can be a baked food and/or extruded food, for instance. In some aspects, and optionally in addition to being baked and/or extruded, a food can be fried, boiled/steamed, dried, leavened, and/or flattened/rolled.

Examples of a baked food herein include bread (e.g., buns, sourdough, rye, whole wheat, pita, flatbread, tortilla, cornbread, brioche, white, baguette, bagels, banana, ciabatta, brown, challah, focaccia, multigrain, bread sticks, soda bread, pumpernickel, potato bread, biscuits, English muffins, whole grain, matzo, lavash, croutons, pizza crust), cakes (e.g., carrot cake, red velvet, angle food, pound cake, chocolate, white, black forest, tiramisu, coffee cake, cheesecake, devil's food, upside-down cake, Boston cream pie, Swiss roll, lemon cake, short cake, chiffon cake, butter cake, spice cake, rum cake, sponge cake, marble cake, coconut cake, pandan cake), muffins, brownies, scones, cookies, bars, custards, pies, crackers (e.g., saltines, oyster crackers, cream crackers, water biscuits, cheese crackers, graham crackers, digestive biscuits, RITZ style crackers), pretzels, pastries, pudding and tarts. Bread herein can be leavened or unleavened.

Examples of an extruded food herein include pasta (e.g., spaghetti, rotini, fusilli, penne, bucatini, macaroni/maccheroni, rigatoni, fettuccine, linguine, vermicelli, ziti, farfalle, gomiti/elbow, rotelle), cereal (e.g., direct expanded cereal, filled cereal, flakes, breakfast cereal), some bread products (e.g., croutons, bread sticks, flat breads), pre-made cookie-dough, dry and semi-moist pet food (e.g., kibbles), and snacks (e.g., cheese curls, filled pillow puffs, chips [e.g., corn chips, pita chips, processed potato chips, tortilla chips], snack sticks [e.g., vegetable sticks], puffed shaped products such as curls [e.g., cheese curls], balls, tubes, bananas, cups, bowls, disks, baby food puffs). Pasta herein can be extruded (e.g., see above) and/or flattened/rolled (e.g., lasagna), fresh or dried, long or short, minute/soup pasta (pastina), filled (e.g., tortellini, ravioli, agnolotti, tortelli), stretched (e.g., cencioni, corzetti, foglie d'ulivo, orecchiette), and/or egg pasta.

Examples of a fried food herein include beignets, churros, fried dough (e.g., elephant ears), doughnuts, falafel, fritters, funnel cake, hushpuppies, jin deui, fish cakes, empaná, curry puffs, curry bread, croquettes, noodles (wheat, rice), frybread/popovers, haliva, kachori, luchi, ma hua, papadum, paratha, pastel, prawn cracker, puri, papri, samosa, shuangbaotai, fried bread sticks, pierogi, pancakes/hotcakes, naan, roti, chapati, waffles, and batter. A fried food herein can be prepared by cooking food in hot vegetable or animal oil/fat, and/or by heating on a pan/griddle or other vessel typically containing at least a small amount of (much less than used in a deep-frying process) vegetable or animal oil/fat on its cooking surface.

A food dough herein can be that used to prepare any of the foregoing products, for example. Semolina flour dough optionally is used to prepare pasta herein.

In some aspects of a food or food dough herein, at least 1% by weight of the combined total amount of the (i) flour and/or meal and (ii) insoluble alpha-1,3-glucan in the food or food dough is the insoluble alpha-1,3-glucan. In some aspects, this weight percentage is about, or at least about, 1%, 2%, 5%, 7.5%, 10%, 12.5%, 15%, 20%, 20%, 30%, 1-30%, 1-25%, 1-20%, 1-15%, 5-30%, 5-25%, 5-20%, 5-15%, or 7.5-12.5%. It can be seen that in some embodiments, the amount of insoluble alpha-1,3-glucan in the food or food dough substitutes for the same amount of flour and/or meal that would otherwise have been included in the food or food dough. Yet, in some aspects, insoluble alpha-1,3-glucan is added in supplementation to the originally called-for amount of flour and/or meal in a food or food dough.

Compared to a counterpart food or food dough only differing by not having any substitution or supplementation of flour and/or meal with insoluble alpha-1,3-glucan, a food or food dough herein can have (i) a dietary fiber increase, and/or (ii) a decrease in gluten content, of about, or at least about, 1%, 2%, 5%, 7.5%, 10%, 12.5%, 15%, 20%, 25%, 30%, 1-30%, 1-25%, 1-20%, 1-15%, 5-30%, 5-25%, 5-20%, 5-15%, or 7.5-12.5%, for example. In some aspects (optionally in addition to the above dietary fiber and/or gluten features), a food or food dough herein, typically a bread or bread dough, can have the same or improved handling/machinability, flavor, shelf life, texture, moisture, shape, cohesiveness, and/or staling resistance characteristics as compared to a counterpart food or food dough only differing by not having any substitution of flour and/or meal with insoluble alpha-1,3-glucan. If improved, such improvement of one or more of these characteristics can be by about, or at least about, 1%, 2%, 5%, 7.5%, 10%, 12.5%, 15%, 20%, 25%, 30%, 1-30%, 1-25%, 1-20%, 1-15%, 5-30%, 5-25%, 5-20%, 5-15%, or 7.5-12.5%, for example, as compared to a counterpart food or food dough only differing by not having any substitution of flour and/or meal with insoluble alpha-1,3-glucan. In some aspects, the shape and/or cohesiveness of a bread or bread flour herein is/are retained while keeping the benefit(s) of increased dietary fiber and/or reduced gluten.

A food or food dough herein can optionally comprise other ingredients in addition to the flour/meal and insoluble alpha-1,3-glucan ingredients. For example, at least one component selected from lipids, emulsifiers, enzymes, salt, sugar (e.g., sucrose, fructose, dextrose), added protein source (e.g., whey protein, egg), added starch, added gluten, leavening agents (e.g., yeast, baking powder, baking soda), natural and/or artificial flavors/colors, aqueous liquid (e.g., water, milk), and artificial sweetener can be included. Examples of lipid ingredients include triglycerides and phospholipids, such as soybean oil, soybean lecithin, butter, lard, margarine, corn oil, peanut oil, canola oil, or olive oil. Examples of emulsifiers include monoglycerides, diglycerides and esters of these glycerides and acids such as monoglyceride lactate or monoglyceride diacetyltartrate. Examples of enzymes include proteolytic enzymes, amylolytic enzymes and hemicellulolytic enzymes (e.g., alpha-amylase, beta-amylase, endo-xylanase, protease). Examples of other agents that can be included in a food or food dough herein include oxidizing agents, reducing agents, and water-binding components such as hydrocolloids (e.g., pectin, gelatin, carboxymethyl cellulose, carrageenan, guar, locust bean gum). A bread can comprise one or more of the foregoing ingredients, for example. Bread or bread dough in some aspects can comprise one or more ingredients as disclosed in any of U.S. Pat. Appl. Publ. Nos. 2005/0013900, 2009/0297663 and 2018/030310, which are incorporated herein by reference. In addition to these references, a food or food dough herein such as a bread or bread dough can optionally comprise one more ingredients according to any of U.S. Pat. Nos. 3,889,003, 3,930,055, 3,987,206, 4,367,241, 4,645,673, 4,687,673, 4,849,230, 5,403,610, 5,409,717, 7,947,319, 7,815,952, 9,883,679 and 8,486,469, all of which are incorporated herein by reference.

Certain embodiments of the present disclosure concern a method of producing a food dough or food composition (all disclosures herein regarding producing dough can optionally likewise characterize producing a food composition). Such a method can comprise mixing (stirring, blending) at least (i) flour and/or meal, (ii) insoluble alpha-1,3-glucan, and (iii) an aqueous composition together to produce a food dough, and can optionally be characterized herein as a food dough preparation method. In some aspects, a method is disclosed simply of providing a food dough comprising at least (i) flour and/or meal, (ii) insoluble alpha-1,3-glucan, and (iii) an aqueous composition; features of a food dough preparation method herein can likewise characterize a food dough provision method, as appropriate.

The amount of, and features of, insoluble alpha-1,3-glucan used in a food dough preparation method herein can be as disclosed above, for example. In some aspects, insoluble alpha-1,3-glucan entered into a preparation method herein is in a dry form (e.g., has less than 3, 2, 1, 0.5, or 0.1 wt % water or aqueous solution). However, particles of insoluble alpha-1,3-glucan entered into a preparation method herein can optionally be in a wet form. For example, insoluble alpha-1,3-glucan particles can comprise about 5%-90% by weight water or an aqueous solution (where the balance of the particles is alpha-1,3-glucan). In some aspects, particles can comprise about 5, 10, 15, 20, 25, 30, 35, 40, 45, 50, 55, 60, 65, 70, 75, 80, 85, 90, 50-90, 50-80, 50-70, 50-60, 55-80, 60-90, 60-80, 60-70, 55-65, 55-80, or 70-80 wt % water or an aqueous solution. Alpha-1,3-glucan particles in wet form can be, for instance, alpha-1,3-glucan that has never been dried following its enzymatic synthesis in a glucosyltransferase reaction. Wet forms of alpha-1,3-glucan particles herein include dispersions and powder-like compositions (e.g., as disclosed in any of U.S. Pat. Appl. Publ. Nos. 2018/0021238 and 2019/0112456, which are incorporated herein by reference), for example.

In some aspects, insoluble alpha-1,3-glucan is provided in the form of a completed (e.g., percent sucrose consumption of at least about 90%, 95%, or 99%) or ongoing glucosyltransferase reaction (i.e., the insoluble alpha-1,3-glucan product along with the soluble fraction [i.e., supernatant] of the reaction). This option provides a convenient way to add fructose as an ingredient to a food dough preparation method, since fructose is a co-product of an alpha-1,3-glucan synthesis reaction herein; reaction byproducts, if present, can optionally also be present. The enzymatic activity of a reaction can be terminated, or not, before using it as an ingredient. In some aspects, alpha-1,3-glucan can be added that has been filtered from most (e.g., ≥70, 80, 90, or 95%) of the soluble fraction (i.e., be wetcake), but that has not been washed with water or any other aqueous solution (i.e., some residual fructose and optionally certain byproducts are still included).

An aqueous composition used in a food dough preparation method herein typically is water, an aqueous solution, and/or an aqueous mixture. An example of an aqueous mixture herein is a dispersion such as a homogenized product (e.g., milk such as skim milk, low-fat milk, whole milk, or other dispersed dairy product). Another example of a dispersion is an alpha-1,3-glucan dispersion (e.g., as disclosed above); i.e., an alpha-1,3-glucan dispersion (or, alternatively, an alpha-1,3-glucan wetcake) can comprise all or some of the aqueous composition component of a dough recipe herein. Further examples of an aqueous composition herein include whole eggs (comprise ~70-80 wt % water), egg whites (comprise ~85-90 wt % water), egg yolks (comprise ~45-50 wt % water), buttermilk, yogurt, sour cream, cottage cheese, soft cheese (e.g., ricotta), coconut milk, juice (e.g., fruit or vegetable juice), beer (e.g., ale, lager), cider, wine, liquor, or soda. One, two, three, four, or more of the foregoing aqueous ingredients can be in the aqueous composition component of a dough recipe herein.

Flour and/or meal as well as one or more additional ingredients used in a food dough preparation method herein can be as disclosed above, for example. Any food dough recipe and/or preparation procedure as disclosed in any of U.S. Pat. Appl. Publ. Nos. 2005/0013900, 2009/0297663 and 2018/030310, and U.S. Pat. Nos. 3,889,003, 3,930,055, 3,987,206, 4,367,241, 4,645,673, 4,687,673, 4,849,230, 5,403,610, 5,409,717, 7,947,319, 7,815,952, 9,883,679 and 8,486,469 (all of incorporated herein by reference) can optionally be used.

The mixing step of a food dough preparation method herein can comprise, for example, addition of all of the (i) flour and/or meal, (ii) insoluble alpha-1,3-glucan, and (iii) an aqueous composition recipe ingredients together into a mixing vessel, followed by mixing, or mixing two of the ingredients first (i and ii, i and iii, ii and iii) followed by admixture of the third remaining ingredient. One or more other ingredients (e.g., any as disclosed above such as a leavening agent) can optionally be included in any of these mixing schemes. Mixing herein can be done manually or via automation (e.g., in a bread machine, if the dough is a bread dough).

A dough preparation method herein can further include, for example, a step of processing the food dough into a food. Such aspects can therefore be characterized as a food preparation method, if desired. In some aspects, dough processing can comprise at least baking, frying, boiling, drying, leavening, chilling, extruding, and/or flattening the food dough. Any of these processing steps can be performed as disclosed in any of U.S. Pat. Appl. Publ. Nos. 2005/0013900, 2009/0297663 and 2018/030310, and U.S. Pat. Nos. 3,889,003, 3,930,055, 3,987,206, 4,367,241, 4,645,673, 4,687,673, 4,849,230, 5,403,610, 5,409,717, 7,947,319, 7,815,952, 9,883,679 and 8,486,469 (all of incorporated herein by reference), for example. Example conditions for making a bread product herein include letting a bread dough rise at a temperature of about 20 to 40° C. (e.g., for about 20 to 45 minutes), followed by baking at a temperature of about 350 to 425° F. (e.g., for a time of about 25 to 45 minutes). In some aspects, a bread machine can be used for conducting rising and/or baking steps (as well as other steps such as mixing), and can be as disclosed in any of U.S. Pat. Nos. 4,957,040, 4,538,509, 5,615,605, 6,035,763 and 6,113,966, for example, which are all incorporated herein by reference.

Certain embodiments of the present disclosure concern a method of producing a food dough or food composition. Such a method can comprise mixing (stirring, blending) at least (i) flour and/or meal. (ii) an aqueous composition, (iii) sucrose and (iv) a glucosyltransferase enzyme that synthesizes insoluble alpha-1,3-glucan, whereby a food dough is produced that comprises insoluble alpha-1,3-glucan. It can be seen that this method takes advantage of enzymatic production of insoluble alpha-1,3-glucan in food dough (and/or precursor thereof such as partially mixed ingredients) in situ. Features of a food dough preparation method herein comprising in situ alpha-1,3-glucan production can likewise characterize a method of providing a food dough (and/or precursor thereof) comprising flour and/or meal, an aqueous composition, sucrose and a glucosyltransferase enzyme, as appropriate.

Insoluble alpha-1,3-glucan as produced in a food dough in situ can be as disclosed above (e.g., molecular weight, linkage profile), for example. Likewise, flour and/or meal, aqueous compositions, and/or glucosyltransferase enzymes for use in an in situ glucan production method herein can be as disclosed above. In some aspects, sucrose can be provided as white refined sucrose, or in an unrefined form such as disclosed in U.S. Pat. No. 9,719,121, for example, which is incorporated herein by reference.

In typical aspects, a dough produced herein comprising at least (i) flour and/or meal, (ii) an aqueous composition, (iii) sucrose and (iv) a glucosyltransferase enzyme is allowed to incubate for a time (e.g., ~0.5 hour to about, or at least about, 1, 2, 4, 6, 8, 10, or 12 hours) and temperature (e.g., ~5-50° C., ~20-40° C., ~30-40° C., ~20-30° C., ~20-25° C., ~20° C., ~25° C., ~30° C., ~35° C., ~37° C., or ~40° C.) allowing the glucosyltransferase enzyme to produce insoluble alpha-1,3-glucan in the dough. It is contemplated that in situ alpha-1,3-glucan synthesis can also occur while initially mixing and/or kneading a dough having all four of ingredients (i), (ii), (iii) and (iv). In some aspects, a preparation comprising at least ingredients (ii), (iii) and (iv) is first prepared and then mixed with ingredient (i); insoluble alpha-1,3-glucan production optionally may occur in the first preparation, and continues after mixing with the flour and/or meal.

Any features of a dough preparation method and of any further dough processing step (e.g., baking) as disclosed above can likewise apply to a dough production method in which alpha-1,3-glucan is produced in situ.

Non-limiting examples of compositions and methods disclosed herein include:

1. A food or food dough comprising at least (i) flour and/or meal, and (ii) insoluble alpha-1,3-glucan.
2. The food or food dough of embodiment 1, comprising the flour and the insoluble alpha-1,3-glucan.
3. The food or food dough of any one of embodiments 1 or 2, wherein at least 50% of the glycosidic linkages of the insoluble alpha-1,3-glucan are alpha-1,3 linkages.
4. The food or food dough of any one of embodiments 1 or 2, wherein at least 80% of the glycosidic linkages of the insoluble alpha-1,3-glucan are alpha-1,3 linkages.
5. The food or food dough of any one of embodiments 1, 2, 3, or 4, wherein the average particle size of the alpha-1,3-glucan is about 1 to 100 microns.
6. The food or food dough of any one of embodiments 1, 2, 3, 4, or 5, wherein the flour comprises wheat flour.
7. The food or food dough of any one of embodiments 1, 2, 3, 4, 5, or 6, which is a baked food and/or extruded food.
8. The food or food dough of any one of embodiments 1, 2, 3, 4, 5, 6, or 7, which is a bread, pasta, cake, or cracker.
9. The food or food dough of any one of embodiments 1, 2, 3, 4, 5, 6, 7, or 8, wherein at least 1% by weight of the combined total amount of the (i) flour and/or meal and (ii) insoluble alpha-1,3-glucan of the food or food dough is the insoluble alpha-1,3-glucan.
10. A method of producing a food dough (e.g., according to any one of embodiments 1, 2, 3, 4, 5, 6, 7, 8, or 9), the method comprising: mixing at least (i) flour and/or meal, (ii) insoluble alpha-1,3-glucan, and (iii) an aqueous composition together to produce a food dough.
11. The method of embodiment 10, comprising mixing at least the flour, insoluble alpha-1,3-glucan, and aqueous composition together to produce a food dough.
12. The method of any one of embodiments 10 or 11, further comprising:
processing the food dough into a food.
13. The method of embodiment 12, wherein the processing comprises at least baking, frying, boiling, drying, leavening, chilling, extruding, and/or flattening the food dough.
14. A method of producing a food dough (e.g., according to any one of embodiments 1, 2, 3, 4, 5, 6, 7, 8, or 9), the method comprising: mixing at least (i) flour and/or meal, (ii) an aqueous composition, (iii) sucrose and (iv) a glucosyltransferase enzyme that synthesizes insoluble alpha-1,3-glucan, whereby a food dough is produced that comprises insoluble alpha-1,3-glucan.
15. The method of embodiment 14, comprising mixing at least the flour, aqueous composition, sucrose and glucosyltransferase enzyme.
16. The method of any one of embodiments 14 or 15, further comprising:
processing the food dough into a food.
17. The method of embodiment 16, wherein the processing comprises at least baking, frying, boiling, drying, leavening, chilling, extruding, and/or flattening the food dough.

EXAMPLES

The present disclosure is further exemplified in the below Example. It should be understood that this Example, while indicating certain aspects herein, is given by way of illustration only. From the above discussion and this Example, one skilled in the art can ascertain the essential characteristics of the disclosed embodiments, and without departing from the spirit and scope thereof, can make various changes and modifications to adapt the disclosed embodiments to various uses and conditions.

Example 1

Addition of Insoluble Alpha-Glucan to Bread

This Example describes producing bread having insoluble alpha-glucan as an ingredient. In particular, insoluble alpha-1,3-glucan was used as an ingredient in place of a certain amount of flour in producing bread.

Two loaves of bread were produced using a PANASONIC SD-BT56P bread machine per the recipes shown below in Table 1. In preparing the experimental loaf, about 10% by weight of the flour component (as compared to the amount of flour used in the control loaf) was replaced with alpha-1,3-glucan. The alpha-1,3-glucan ingredient was provided as a dry powder and had an average particle size of about 20 microns (which is similar to the particle size of the flour) (this was a D50 value determined, by measuring particle size distribution by light scattering) and a weight-average degree of polymerization (DPw) of about 849. About 100% of the glycosidic linkages of the alpha-1,3-glucan were alpha-1,3 linkages.

TABLE 1

Bread Recipes[a]

| Ingredient | Control | Experimental |
| --- | --- | --- |
| Wheat flour (bleached) | 358.6 | 322.7 |
| Alpha-1,3-glucan | 0 | 35.9 |
| Sugar (white) | 29.7 | 29.7 |
| Salt | 7.1 | 7.1 |
| Water | 211.4 | 211.4 |
| Butter | 28.1 | 27.9 |
| Yeast | 5.16 | 5.16 |

[a]All listed ingredient amounts are in units of grams.

The bread machine was set to a four-hour cycle for auto-preparing each loaf; the control loaf was prepared before the experimental loaf. Each loaf was held in the machine for 5 minutes after cycle completion before removal from the machine.

Figure 1:
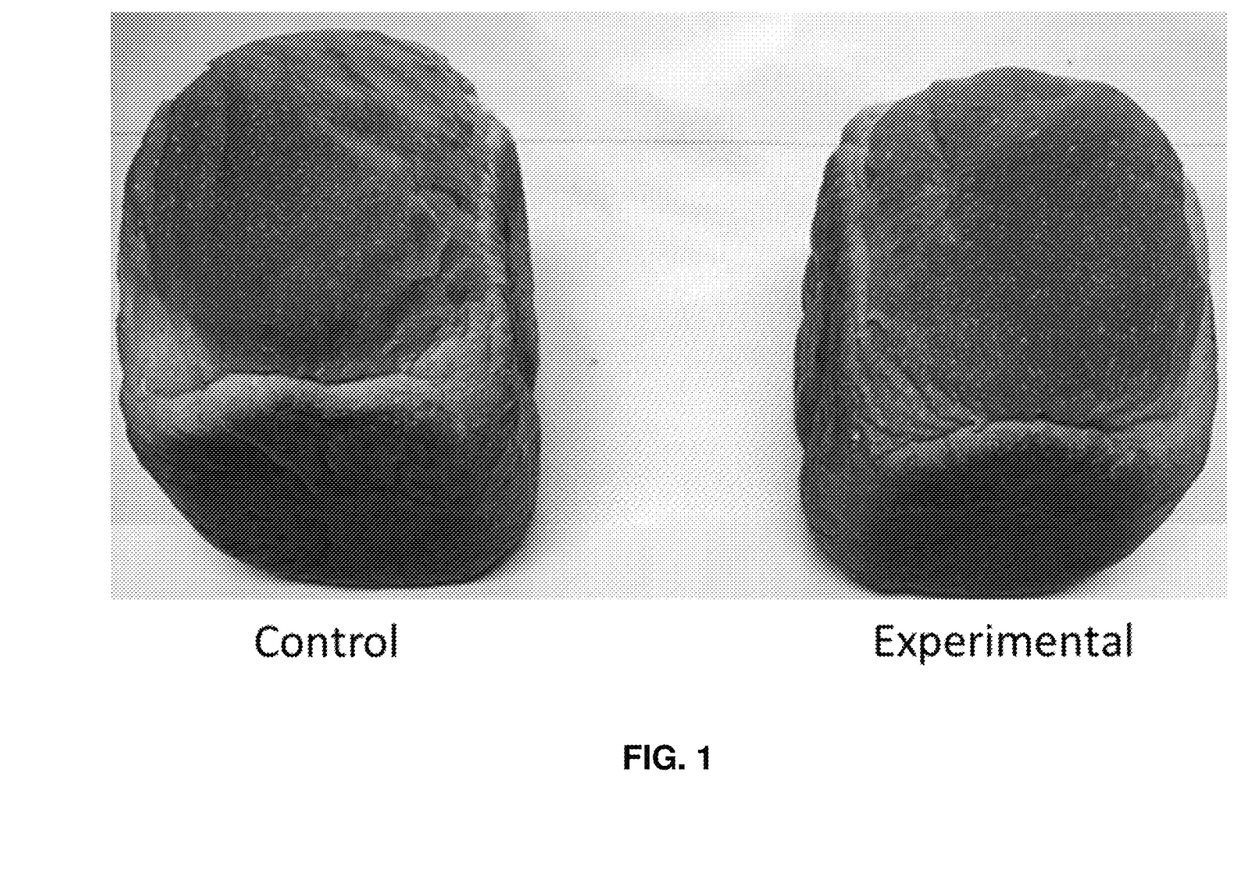
FIG. 1: Shown are control (no alpha-1,3-glucan ingredient) and experimental (containing alpha-1,3-glucan as replacement of 10% of wheat flour ingredient) baked bread loaves. Refer to Example 1.
Figure 2:
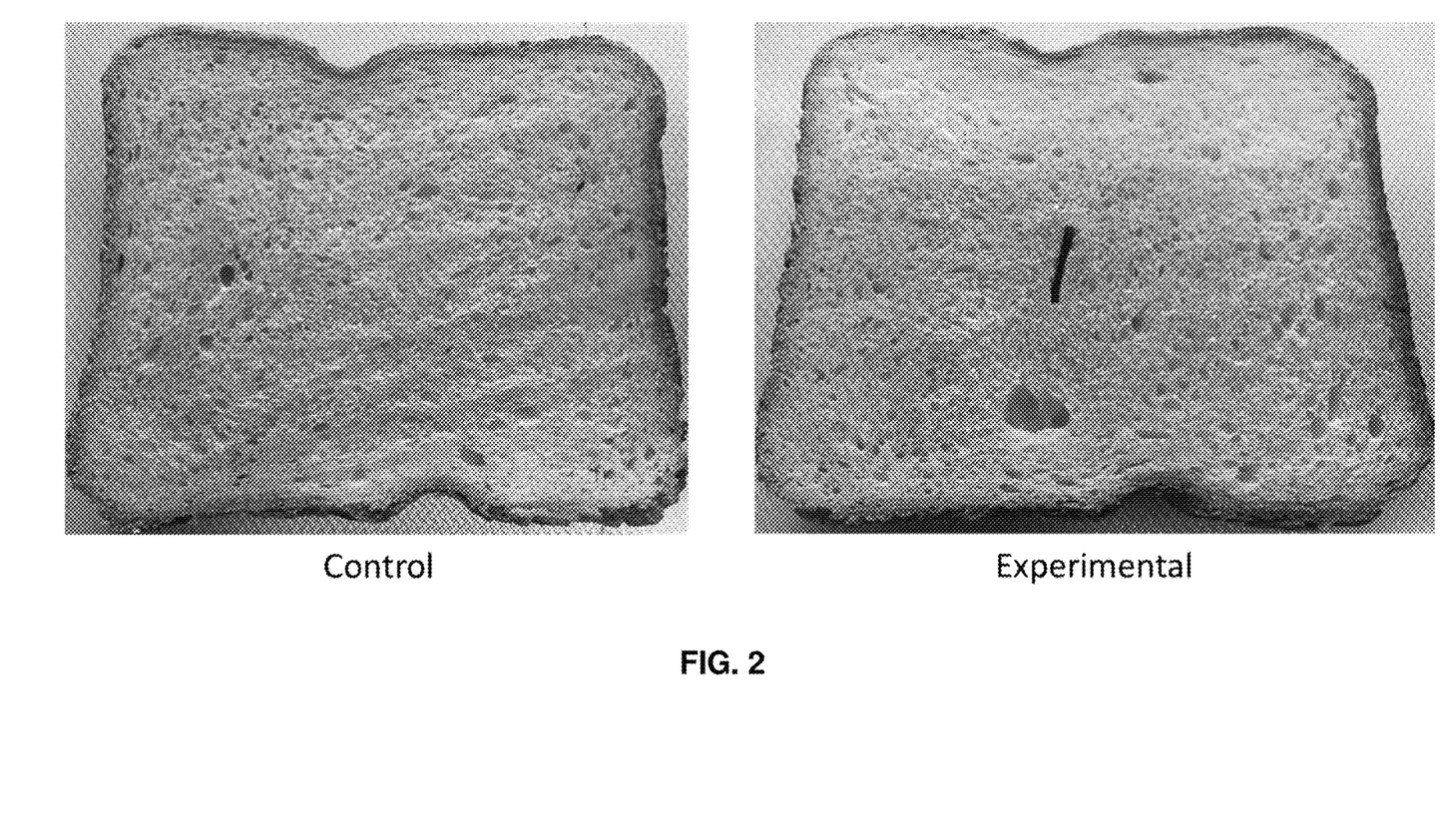
FIG. 2: Shown are slices from each of the loaves shown in FIG. 1. Refer to Example 1.

Final size and weight measurements of each loaf were analyzed. The final weights of the control and experimental loaves were 561.0 and 563.2 grams, respectively, while the final heights of the control and experimental loaves were 6.25 and 6.0 inches, respectively. So while the weights of each of the loaves were very similar, the height of the experimental loaf was about 4% less than the height of the control loaf. It is noted that the experimental loaf was analyzed for size/weight while it was still hot out of the machine (the control loaf had already cooled down prior to analyzing). FIG. 1 shows pictures of each of the final loaves side-by-side, and FIG. 2 compares slices from each loaf. Overall, the loaves had equivalent shape and color, and the textures of their slices also appeared to be equivalent.

Thus, bread comprising the insoluble alpha-glucan, alpha-1,3-glucan, was produced. The partial replacement of wheat flour with insoluble alpha-1,3-glucan in bread and other flour-containing food products should be useful for increasing the dietary fiber content of these products, while also reducing gluten content.

What is claimed is:

1. A method of producing a food dough, said method comprising:
    mixing at least (i) flour, (ii) an aqueous composition, (iii) sucrose, and (iv) a glucosyltransferase enzyme that synthesizes insoluble alpha-1,3-glucan, whereby a food dough is produced, wherein insoluble alpha-1,3-glucan is produced in the food dough, and wherein at least 80% of the glycosidic linkages of the insoluble alpha-1,3-glucan are alpha-1,3 linkages.

2. The method of claim 1, further comprising:
    processing the food dough into a food.

3. The method of claim 2, wherein said processing comprises at least baking, frying, boiling, drying, chilling, extruding, and/or flattening the food dough.

4. The method of claim 2, wherein said processing comprises at least baking the food dough.

5. The method of claim 2, wherein the food is a pasta, cake, or cracker.

6. The method of claim 2, wherein the food is a bread.

7. The method of claim 1, wherein the glycosidic linkages of the insoluble alpha-1,3-glucan that are not alpha-1,3 linkages are all alpha-1,6 linkages.

8. The method of claim 1, wherein the flour comprises wheat flour.

9. The method of claim 1, wherein at least 90% of the glycosidic linkages of the insoluble alpha-1,3-glucan are alpha-1,3 linkages.

10. The method of claim 8, wherein at least 90% of the glycosidic linkages of the insoluble alpha-1,3-glucan are alpha-1,3 linkages.

11. The method of claim 1, wherein the food dough further comprises at least one dextran primer.

12. A food or food dough comprising at least (i) flour and (ii) insoluble alpha-1,3-glucan, wherein at least 80% of the glycosidic linkages of the insoluble alpha-1,3-glucan are alpha-1,3 linkages.

13. The food or food dough of claim 12, wherein at least 90% of the glycosidic linkages of the insoluble alpha-1,3-glucan are alpha-1,3 linkages.

14. The food or food dough of claim 12, which is a baked food and/or extruded food.

15. The food or food dough of claim 12, which is a bread, pasta, cake, or cracker.

16. The food or food dough of claim 12, wherein the flour comprises wheat flour.

17. The food or food dough of claim 16, which is a baked food and/or extruded food.

18. The food or food dough of claim 16, which is a bread, pasta, cake, or cracker.

19. The food or food dough of claim 12, wherein at least 1% by weight of the combined total amount of the (i) flour and (ii) insoluble alpha-1,3-glucan of the food or food dough is the insoluble alpha-1,3-glucan.

20. The food or food dough of claim 12, which has a gluten content that is reduced by at least 10% as compared a counterpart food or counterpart food dough that only differs from said food or food dough by not having said insoluble alpha-1,3-glucan.

* * * * *